United States Patent
Xue et al.

(10) Patent No.: US 9,443,120 B2
(45) Date of Patent: Sep. 13, 2016

(54) METHOD AND DEVICE FOR IMPROVING THE ENERGY EFFICIENCY PERFORMANCE OF A READER

(75) Inventors: Tao Xue, Shenzhen (CN); Hui Liu, Shenzhen (CN); Junchao Du, Shenzhen (CN); Shujun Liu, Shenzhen (CN); Jiangkun Guo, Shenzhen (CN); Qingzhe Deng, Shenzhen (CN); Chuanyi Liu, Shenzhen (CN); Wen He, Shenzhen (CN); Xuan Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 189 days.

(21) Appl. No.: 14/003,251

(22) PCT Filed: Aug. 24, 2011

(86) PCT No.: PCT/CN2011/078851
§ 371 (c)(1),
(2), (4) Date: Sep. 5, 2013

(87) PCT Pub. No.: WO2012/119413
PCT Pub. Date: Sep. 13, 2012

(65) Prior Publication Data
US 2013/0342328 A1 Dec. 26, 2013

(30) Foreign Application Priority Data
Mar. 8, 2011 (CN) .......................... 2011 1 0055793

(51) Int. Cl.
*H04Q 5/22* (2006.01)
*G06K 7/10* (2006.01)

(52) U.S. Cl.
CPC ................................ *G06K 7/10207* (2013.01)

(58) Field of Classification Search
CPC ............ H05B 37/029; H05B 33/0803; H05B 33/0842; H05B 37/0236; F21K 9/135; F21K 9/50; F21V 23/0464; F21V 3/04; F21W 2121/006; F21Y 2101/02; G02B 6/0008; G02B 6/001; G02B 6/0031; G02B 6/0036; G02B 6/0043; G02B 6/0055; G02B 6/006; G02B 6/0061; G06K 7/0008; G06K 7/10297; G06K 7/10366; G06K 7/10029; H04W 80/00; H04W 52/367; H04B 5/0062; Y02B 60/50
USPC ..................... 340/10.1–10.52, 3.51
See application file for complete search history.

(56) References Cited

U.S. PATENT DOCUMENTS

2005/0280506 A1* 12/2005 Lobanov et al. ............. 340/10.1
2006/0208860 A1*  9/2006 Park et al. .................... 340/10.2
(Continued)

FOREIGN PATENT DOCUMENTS

| CN | 101286192 A | 10/2008 |
| CN | 101436243 A | 5/2009 |

(Continued)

OTHER PUBLICATIONS

International Search Report for PCT Application No. PCT/CN2011/078851 mailed Oct. 27, 2011 (English translation) (2 pages).

*Primary Examiner* — Emily C Terrell
(74) *Attorney, Agent, or Firm* — Sutherland Asbill & Brennan LLP

(57) ABSTRACT

A method for improving energy efficiency performance of a reader is disclosed in the present document. The method includes: initializing and adjusting operation parameters, and acquiring the current number of frame timeslots; updating a frame timeslot status, and determining that a power level is not required to be increased according to the updated frame timeslot status; and estimating the number of labels according to the current number of frame timeslots, and acquiring an optimum Q value according to the number of labels. A device for improving energy efficiency performance of a reader is also disclosed in the present document. With the method and device of the present document, throughput of a Radio Frequency Identification (RFID) system is maximized, thereby reducing energy consumption of the system and extending usage time of the system; and while the energy consumption is reduced, a rate at which the reader reads the labels is guaranteed.

10 Claims, 4 Drawing Sheets

| Power level (dBm) | 14 | 14.5 | 15 | 15.5 | 16 | 16.5 | 17 |
|---|---|---|---|---|---|---|---|
| Label response rate | 0% | 0% | 30% | 30% | 30% | 90% | 100% |
| Power level (dBm) | 17.5 | 18 | 18.5 | 19 | 19.5 | 20 | ... |
| Label response rate | 100% | 100% | 100% | 100% | 100% | 100% | ... |

(56) References Cited

U.S. PATENT DOCUMENTS

| | | | |
|---|---|---|---|
| 2007/0075838 A1* | 4/2007 | Powell | G06K 7/0008 340/10.2 |
| 2008/0111661 A1* | 5/2008 | Lin et al. | 340/10.1 |
| 2008/0150674 A1 | 6/2008 | Park et al. | |
| 2008/0191843 A1 | 8/2008 | Strzelczyk | |
| 2010/0141395 A1* | 6/2010 | Nagai | G06K 7/0008 340/10.4 |

FOREIGN PATENT DOCUMENTS

| | | |
|---|---|---|
| CN | 101510249 A | 8/2009 |
| CN | 102004895 A | 4/2011 |

* cited by examiner

| Total number of labels | 0-1 | 2 | 3-5 | 6-8 | 9-13 | 14-25 | 26-39 | 40-58 | ... |
|---|---|---|---|---|---|---|---|---|---|
| Q | 1 | 2 | 3 | 4 | 5 | 6 | 7 | 8 | ... |

FIG. 5

| Power level (dBm) | 14 | 14.5 | 15 | 15.5 | 16 | 16.5 | 17 |
|---|---|---|---|---|---|---|---|
| Label response rate | 0% | 0% | 30% | 30% | 30% | 90% | 100% |
| Power level (dBm) | 17.5 | 18 | 18.5 | 19 | 19.5 | 20 | ... |
| Label response rate | 100% | 100% | 100% | 100% | 100% | 100% | ... |

FIG. 6

METHOD AND DEVICE FOR IMPROVING THE ENERGY EFFICIENCY PERFORMANCE OF A READER

CROSS REFERENCE TO RELATED APPLICATIONS

This application claims the priority benefit of PCT/CN2011/078851 filed on Aug. 24, 2011 and Chinese Application No. 201110055793.3 filed on Mar. 8, 2011. The contents of these applications are hereby incorporated by reference in their entirety.

TECHNICAL FIELD

The present document relates to the field of Radio Frequency Identification (RFID) technology, and particularly, to a method and device for improving energy efficiency performance of a reader.

BACKGROUND OF THE RELATED ART

An RFID system can be composed of at least one reader and one label, and communication is performed between the reader and the label in a wireless way. In recent years, with the extensive use of the RFID technology in numerous fields such as logistics, inventory management, retail and public transportation and so on, how to enhance performances of the RFID system, such as anti-collision, reading rate, security certificate and response time and so on, is the content extensively studied by many scientific research institutions at the present.

Currently, though studies on the performances of the RFID system are extremely extensive, with respect to an RFID reader, especially studies on the problem of energy consumption of a passive portable RFID reader are very limited, and in application scenarios such as bulk warehouse and container terminal and so on, it is required to adopt the passive reader to perform communication with labels, thus how the battery-powered passive reader reads labels as many as possible becomes the problem required to be concerned and solved.

SUMMARY OF THE INVENTION

In view of this, the main object of the present document is to provide a method and device for improving energy efficiency performance of a reader, which maximizes the throughput of an RFID system, thereby reducing energy consumption of the system and extending usage time of the system; and while the energy consumption is reduced, a rate at which the reader reads the labels is guaranteed.

In order to solve the above technical problem, the technical scheme of the present document is implemented as follows.

The present document provides a method for improving energy efficiency performance of a reader, which comprises: initializing and adjusting operation parameters, and acquiring a current number of frame timeslots; updating a frame timeslot status, and determining that a power level is not required to be increased according to the updated frame timeslot status; and estimating a number of labels according to the current number of frame timeslots, and acquiring an optimum Q value according to the number of labels.

In the above scheme, the step of initializing and adjusting operation parameters and acquiring a current number of frame timeslots comprises: initializing the operation parameters, adding an increment value to a current power level in the operation parameters, adding 1 to Q, and acquiring the current number of frame timeslots according to a current Q value and a calculation formula for the number of frame timeslots.

In the above scheme, before updating the frame timeslot status, the method further comprises: when determining that current power is less than or equal to a maximum power value, updating the frame timeslot status; and when determining that the current power is greater than the maximum power value, estimating the number of labels according to the current number of frame timeslots.

In the above scheme, the step of updating the frame timeslot status comprises: according to the current number of frame timeslots and a communication protocol between the reader and the labels, updating a number of idle timeslots, a number of successful timeslots and a number of conflicting timeslots.

In the above scheme, the step of determining that a power level is not required to be increased according to the updated frame timeslot status comprises: when the number of conflicting timeslots is equal to 0, or when the number of conflicting timeslots is greater than 0 and the number of successful timeslots is equal to 0, and when an iteration value after iterating is greater than a maximum iteration value, determining that the power level is not required to be increased.

In the above scheme, the step of estimating a number of labels according to the current number of frame timeslots and acquiring an optimum Q value according to the number of labels comprises: making the current number of frame timeslots equal to a total number of labels, and according to a mapping relationship table between the total number of labels and the optimum Q value, acquiring an optimum Q value corresponding to the total number of labels, and setting the current Q value as the optimum Q value.

The present document further provides a device for improving energy efficiency performance of a reader, which comprises: an initialization module, an adjustment module, a setting module and an estimation module;

the initialization module is configured to: initialize operation parameters, and notify the adjustment module;
the adjustment module is configured to: adjust the operation parameters, acquire a current number of frame timeslots, and notify the setting module;
the setting module is configured to: update a frame timeslot status, determine that a power level is not required to be increased according to the frame timeslot status, and send the current number of frame timeslots to the estimation module; wherein the notification contains the current number of frame timeslots; and
the estimation module is configured to: estimate a number of labels according to the current number of frame timeslots, and acquire an optimum Q value according to the number of labels.

In the above scheme, the initialization module is specifically configured to: initialize the operation parameters in the adjustment module and the setting module; the adjustment module is specifically configured to: add an increment value to a current power level in the operation parameters, add 1 to Q, and acquire the current number of frame timeslots according to a current Q value and a calculation formula for the number of frame timeslots.

In the above scheme, the adjustment module is further configured to: add the increment value to the current power level, when determining that the current power level is less than or equal to a maximum power level value, send the current number of frame timeslots to the setting module; and when determining that the current power level is greater than the maximum power level value, send the current number of frame timeslots to the estimation module.

In the above scheme, the setting module is specifically configured to: according to a received current number of frame timeslots and a communication protocol between the reader and the labels, update a number of idle timeslots, a number of successful timeslots and a number of conflicting timeslots.

In the above scheme, the setting module is specifically configured to: when the number of conflicting timeslots is 0, or when the number of conflicting timeslots is greater than 0 and the number of successful timeslots is 0, and when determining that an iteration value after iterating is greater than a maximum iteration value, determine that the power level is not required to be increased.

In the above scheme, the estimation module is specifically configured to: make the current number of frame timeslots equal to a total number of labels, and according to a mapping relationship table between the total number of labels and the optimum Q value, acquire an optimum Q value corresponding to the total number of labels, and set the Q value in the adjustment module as the optimum Q value.

It can be seen that, with the method and device of the present document, in the premise of reducing the label collision as much as possible, the total number of labels is estimated to acquire the optimum Q value, which can maximize the throughput of the RFID system, thereby reducing energy consumption of the system and extending usage time of the system. Meanwhile, in the present document, when the energy consumption is reduced, the total number of labels is firstly estimated, thereby acquiring the appropriate number of timeslots, and the energy consumption is reduced while a rate at which the reader reads the labels is guaranteed.

BRIEF DESCRIPTION OF DRAWINGS

FIG. 5 is a schematic diagram of a mapping relationship between the total number of labels and Q value.

FIG. 6 is a schematic diagram of a mapping relationship between power levels and label response rates.

PREFERRED EMBODIMENTS OF THE INVENTION

The basic idea of the present document is: a reader initializing and adjusting operation parameters, acquiring the current number of frame timeslots, updating a frame timeslot status, determining that a power level is not required to be increased according to the frame timeslot status, estimating the total number of labels according to the current number of frame timeslots, and acquiring an optimum Q value according to the total number of labels.

Figure 1:
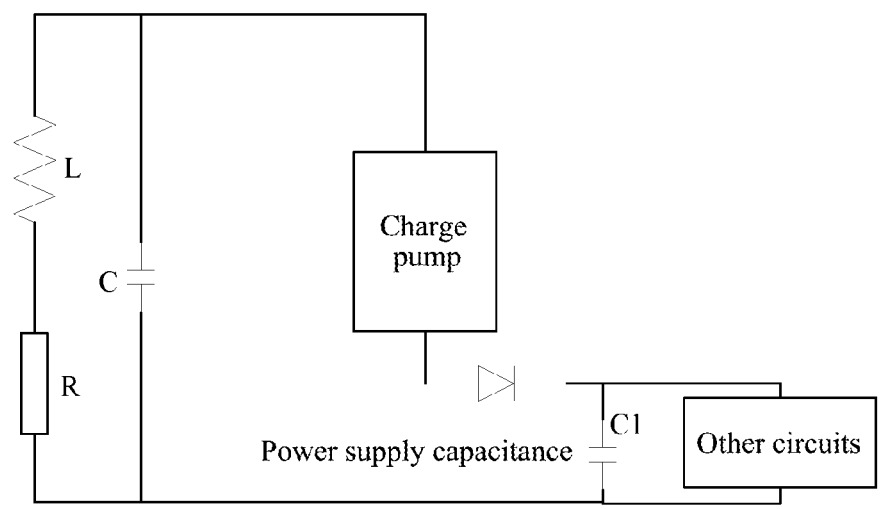
FIG. 1 is a principle diagram of a device for passive labels obtaining energy.

A principle of a device for passive labels obtaining energy is as shown in FIG. 1. When working, the reader continually transmits a group of electromagnetic waves at a fixed frequency outward, when a label gets close to the reader, an LC parallel resonant circuit within the label will generate resonance, and a frequency of the LC parallel resonant circuit is the same as a transmitting frequency of the reader, thereby making a capacitance C be charged and have charges. At the other end of the capacitance C, a charge pump of unilateral conduction is connected, and the charges within the capacitance C are sent to another capacitance C1 to be stored. When the capacitance C1 is charged to a certain voltage, the capacitance C1 serves as the power supply and provides working voltage for other circuits on the label, thereby data within the label is transmitted out or data sent from the reader are received and stored. Wherein, according to the charging process, the label can have three statuses, which are respectively an idle status, namely an outage status of C1; a lossy status, namely a status between the outage status and a fully charged status of C1; and an active status, namely a fully charged status.

Figure 2:
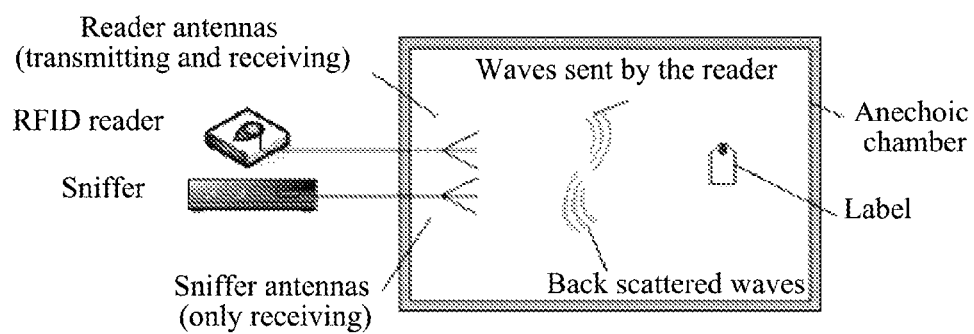
FIG. 2 is a diagram of a device for detecting a response rate of the physical layer.
Figure 3:
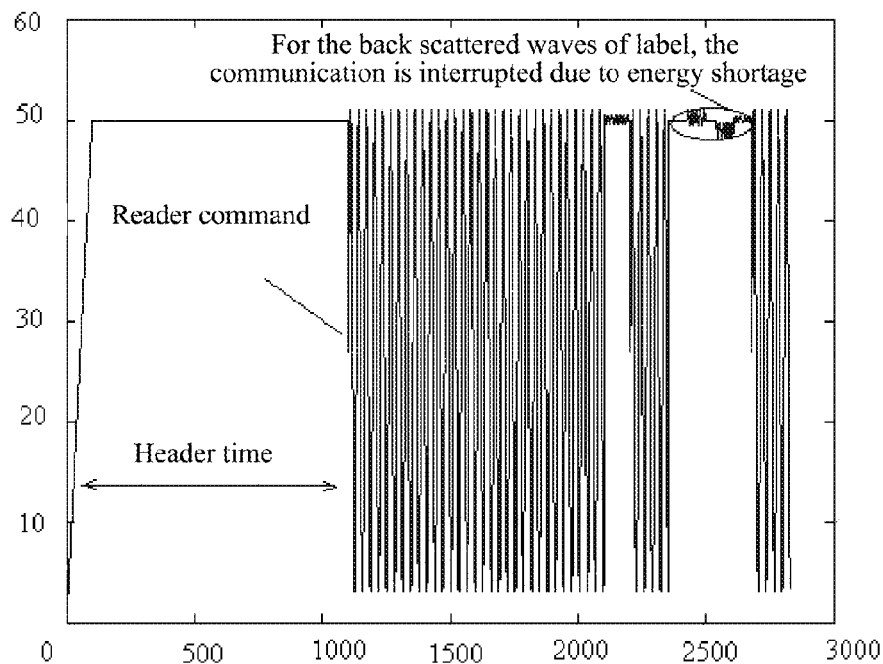
FIG. 3 is a schematic diagram of a waveform of the physical layer in a lossy status.

According to a device for detecting a response rate of the physical layer as shown in FIG. 2, the response rate of the physical layer during the communication between the labels and the reader is measured through a sniffer. By analyzing a waveform diagram of the physical layer, it can be discovered that, in the three statuses, when the label is in the idle status, it can not communicate with the reader; when the label is in the lossy status, in the waveform diagram of the physical layer in the lossy status as shown in FIG. 3, when a label replies to a query of the reader in a form of back scattered waves, due to energy shortage of the label, a communication between the label and the reader will be interrupted, but the reader still uses the energy level at normal state to wait for the communication between the reader and the label, which causes an energy loss of the reader; during the active status, the communication between the reader and label is normal, and the energy consumption is comparatively low.

Figure 4:
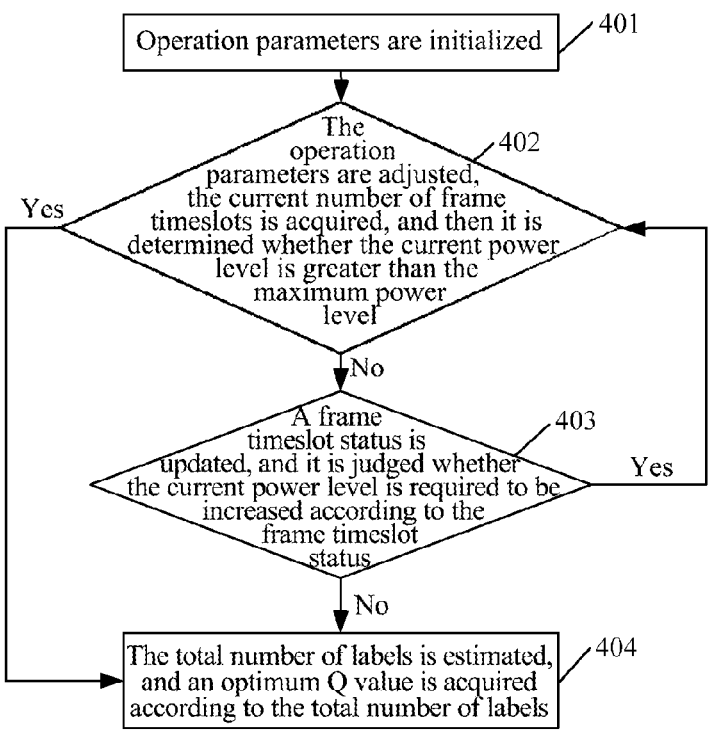
FIG. 4 is a flow diagram of a method for improving energy efficiency performance of a reader according to the present document.

A method for improving energy efficiency performance of a reader provided in the present document is as shown in FIG. 4, and the following steps are specifically included.

In step 401, operation parameters are initialized.

The reader sends a query to labels in a form of scattered waves, starts the communication between the reader and the labels, and determines that a collision occurs between the labels, and the reader initializes the operation parameters.

The step of the reader determining that a collision occurs between the labels includes: according to a communication protocol between the reader and the labels, if codes received by the reader and replied by the labels contain reply failure information, it is indicated that the collision occurs between the labels and there exist conflicting timeslots. There are following reasons for the occurrence of collision between the labels, the labels reply the query of the reader at the same timeslot; or the labels are in the lossy status and the energy shortage causes the reply interruption; or the labels are damaged and the reply information is wrong.

The process of initializing the operation parameters includes: the reader sets a current power level P as $P=P_{min}-0.5$, wherein, a minimum power level $P_{min}$ and a maximum power level $P_{max}$ below are decided by a power level range of the reader itself, meanwhile, initializing $X_i$ as 0 and initializing Q as 1. The $X_i$ is an iteration value, the Q is a quality factor of the reader antenna which influences the transmission efficiency and throughput of reader energy, a value range of the Q is decided by the reader itself, and the throughput is a probability of the reader reading the labels successfully.

In step 402, the operation parameters are adjusted, the current number of frame timeslots is acquired, and then it is determined whether the current power level is greater than the maximum power level, if yes, the current power level is the maximum power level, and then step 404 is executed, and if not, step 403 is executed.

The acquisition of the current number of frame timeslots can be implemented according to a current Q value and a calculation formula for the number of frame timeslots. The calculation formula for the number of frame timeslots is:

$$N_S = 2^Q \quad \text{formula (1)}.$$

The adjustment of the operation parameters includes: adding an increment value to the current power level, and adding 1 to the Q value at the meantime; when the increment value is added to the current power level P, it is assumed that the increment value is 0.5, P=P+0.5, then the P and the maximum power level $P_{max}$ are compared, if the P is greater than the $P_{max}$, according to the current Q value and the formula (1), the current number of frame timeslots is acquired, and step 404 is executed, and if the P is not greater than the $P_{max}$, step 403 is executed.

In step 403, a frame timeslot status is updated, and it is judged whether the current power level is required to be increased according to the frame timeslot status; if yes, step 402 is executed, and if not, step 404 is executed.

The update of the frame timeslot status includes: updating the number of idle timeslots $S_0$, the number of successful timeslots $S_1$ and the number of conflicting timeslots $S_2$ according to the current number of frame timeslots and the communication protocol between the reader and the labels.

The update of the $S_0$, $S_1$ and $S_2$ according to the current number of frame timeslots and the communication protocol between the reader and the labels includes: firstly the reader receives replies of the labels, according to the communication protocol, if codes replied by the labels contain reply failure information, it is indicated that a collision occurs between the labels, and the number of received replies containing the failure information is the number of conflicting timeslots; similarly, the number of received replies containing success information is the number of successful timeslots; and according to the acquired current number of frame timeslots, the number of conflicting timeslots and the number of successful timeslots, the number of idle timeslots can be acquired, and the number of idle timeslots is $S_0 = N_S - S_1 - S_2$.

The step of judging whether the current power level is required to be increased according to the frame timeslot status includes: it is judged whether the $S_2$ is 0, if the $S_2$ is greater than 0, it is indicated that the collision occurs between the labels at the point, it is further judged whether the $S_1$ is greater than 0, if the $S_1$ is greater than 0, it is indicated that there exist both conflicting timeslots and successful timeslots at the point, in order to reduce an occurrence probability of the conflicting timeslots, it is required to increase the current power level and clear the $X_i$, and then step 402 is executed; if the $S_1$ is equal to 0, it is indicated that there exist conflicting timeslots but no successful timeslots at the present, no labels perform normal communication with the reader, the condition is abnormal, it is judged whether an iteration value after iterating is greater than a maximum iteration value, if the iteration value is greater than the maximum iteration value, it is indicated that the power level has increased to a certain degree, but the abnormal condition still exists, if it continues to increase the power level, excessive energy consumption of the system will be caused, in order to guarantee the system throughput, the energy consumption is reduced as much as possible, the existence of current conflicting timeslots is kept, and step 404 is executed; if the iteration value is less than or equal to the maximum iteration value, it is indicated that the conflicting timeslots still have space to be reduced, step 402 is executed, the maximum iteration value $X_{bound}$ is set according to a difference error rate of the reader, a probability limit of the difference error rate is the $X_{bound}$, and the difference error rate is a probability of the reader reading the labels incorrectly, which can be acquired according to actual measurement. The step of judging whether an iteration value after iterating is greater than a maximum iteration value includes: $X_i = X_i + 1$, then the $X_i$ and the $X_{bound}$ are compared, if the $X_i$ is less than or equal to the $X_{bound}$, the iteration value after iterating is less than or equal to the maximum iteration value, and if the Xi is greater than the $X_{bound}$, the iteration value after iterating is greater than the maximum iteration value.

If the $S_2$ is equal to 0, it is indicated that no collision occurs currently, the $X_i$ is cleared, and then step 404 is executed.

In step 404, the total number of labels is estimated, and an optimum Q value is acquired according to the total number of labels.

The estimation of the total number of labels, namely the total number of labels participating in the communication, includes: reading the current number of frame timeslots $N_S$, according to a throughput computation formula, it can be known that the system can reach the maximum throughput in a case that the $N_S$ and the total number of labels are equal, thus the total number of labels is the current number of frame timeslots, according to the total number of labels, a mapping relationship table between the total number of labels and the optimum Q value is read, an optimum Q value corresponding to the total number of labels is acquired, the current Q value is set as the acquired optimum Q value, and the maximum throughput can be acquired, thereby making the energy consumption of the reader minimum at the present. The mapping relationship table between the total number of labels and the optimum Q value can be acquired through a measurement based on experience, when a transmission rate between the reader and labels is 10 kbp, the mapping relationship between the total number of labels and the optimum Q value is as shown in FIG. 5; the throughput is the probability of the reader reading the labels successfully, according to the throughput computation formula:

$$\text{Throughput} = S_1 / (S_0 * T0 + S_1 * T1 + S_2 * T2) \quad \text{formula (2)},$$

$$\text{then according to } S_0 N_S * (1 - 1/N_S)^{NT} \quad \text{formula (3)},$$

$$S_1 = N_T * (1 - 1/N_S)^{NT-1} \quad \text{formula (4) and}$$

$$S_2 = N_S - S_0 - S_1 \quad \text{formula (5)},$$

the formulas (3), (4) and (5) are substituted into the formula (2), and meanwhile, $N_S = N_T$, thus the maximum throughput can be acquired, wherein, the T0, T1 and T2 are respectively an idle timeslot length, a successful timeslot length and a conflicting timeslot length, which can be acquired through measurement.

According to the actual measurement results, it can be known that a label response rate keeps at 100% after the power level reaches a certain value, in the mapping relationship table between the label response rate and the power level as shown in FIG. 6, a mapping relationship between the label response rate and the power level can be acquired based on experience, wherein, when the power level reaches a critical point as 17 dBm shown in FIG. 6, the label response rate is 100%, the power level is further increased, the label response rate keeps unchanged, this is a kind of wasting with regard to the energy of the reader, and according to the measurement results, it can be known that the system throughput is the maximum when the power level of the reader is at the critical point. Therefore, in the scheme of the present document, it can be seen that the acquisition of the optimum Q value makes the system reach the maximum throughput and makes the system keep the power level at the maximum throughput, which can minimize the energy consumption of the reader.

Figure 7:
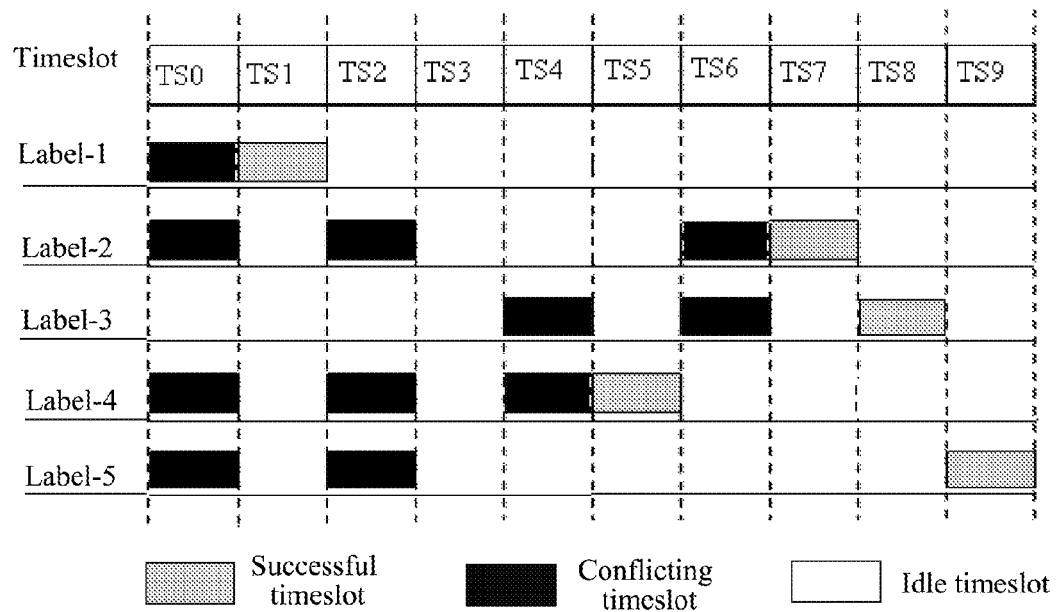
FIG. 7 is a schematic diagram of distribution of frame timeslots in a process of the communication between the reader and labels.

The descriptions with regard to the conflicting timeslots, the successful timeslots and the idle timeslots are as shown in FIG. 7, it is assumed that the system has 5 labels, the reader sends a command to the labels, and all the 5 labels reply to a query of the reader in a form of back scattered waves after receiving the command. Since the labels reply randomly, the labels can select any timeslot to make a response, thus different labels may reply to the query of the reader at the same timeslot, this will cause the collision, and at the point, the timeslot is a conflicting timeslot, such as TS0, TS2, TS4 or TS6 in the figure. The labels reply to the query of the reader in the conflicting timeslots, due to the occurrence of collision, the reader cannot read the labels correctly and the labels cannot be identified by the reader. The labels which are not identified by the reader will constantly select new timeslots to reply to the query of the reader, if only one label in a timeslot makes a response at a certain moment, it can successfully reply to the query of the reader, and the timeslot is a successful timeslot, such as TS1, TS5, TS7, TS8 or TS9 in the figure. The labels which are identified by the reader are temporarily in a dormant state and will not occupy the timeslots any more. Meanwhile, it may also be that there is no label in the same timeslot to reply to the response of the reader, then this timeslot is an idle slot, such as TS3 in the figure.

Figure 8:
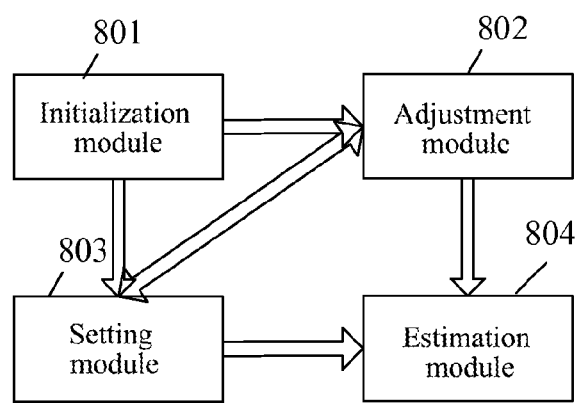
FIG. 8 is a schematic diagram of composition of a device for improving energy efficiency performance of a reader according to the present document.

Based on the above method, the present document further provides a device for improving energy efficiency performance of a reader, and as shown in FIG. 8, the device includes: an initialization module 801, an adjustment module 802, a setting module 803 and an estimation module 804;

the initialization module 801 is configured to: initialize operation parameters, and notify the adjustment module 802 after completing the initialization; and initializing the operation parameters includes: setting a current power level P in the adjustment module 802 as P=$P_{min}$–0.5, initializing Q as 1 and initializing $X_i$ in the setting module 803 as 0;

the adjustment module 802 is configured to: adjust the operation parameters, acquire the current number of frame timeslots, when determining that the current power level is less than or equal to a maximum power level value, notify the setting module 803, and when determining that the current power level is greater than the maximum power level value, use the current power level as the maximum power level, and notify the estimation module 804; adjusting the operation parameters includes: adding an increment value to the current power level and adding 1 to the current Q value; and the notification contains the current number of frame timeslots;

the setting module 803 is configured to: update a frame timeslot status, and according to the frame timeslot status, when determining that the power level is required to be increased, notify the adjustment module 802; and when determining that the power level is not required to be increased, send the current number of frame timeslots to the estimation module 804; and the estimation module 804 is configured to: estimate the total number of labels according to the current number of frame timeslots, acquire an optimum Q value according to the total number of labels, and set the current Q value as the optimum Q value.

The setting module 803 is specifically configured to: read the current number of frame timeslots, and according to the number of frame timeslots and a communication protocol between the reader and the labels, update the number of idle timeslots, the number of successful timeslots and the number of conflicting timeslots. Updating according to the number of frame timeslots and the communication protocol between the reader and the labels includes: the reader receives replies of the labels, according to the communication protocol, if codes replied by the labels contain reply failure information, it is indicated that a collision occurs between the labels, and the number of received replies containing the failure information is the number of conflicting timeslots; similarly, the number of received replies containing success information is the number of successful timeslots; and according to the acquired current number of frame timeslots, the number of conflicting timeslots and the number of successful timeslots, the number of idle timeslots can be acquired.

The setting module 803 is specifically configured to: when the number of conflicting timeslots is 0, or when the number of conflicting timeslots is greater than 0 and the number of successful timeslots is 0, and when determining that an iteration value after iterating is greater than a maximum iteration value, determine that the power level is not required to be increased; and when the number of conflicting timeslots is greater than 0 and the number of successful timeslots is greater than 0, or when the number of conflicting timeslots is greater than 0 and the number of successful timeslots is 0, and when determining that the iteration value after iterating is less than or equal to the maximum iteration value, determine that the power level is required to be increased.

The estimation module 804 is specifically configured to: make the current number of frame timeslots equal to the total number of labels, and according to a mapping relationship table between the total number of labels and the optimum Q value, acquire an optimum Q value corresponding to the total number of labels, and set the Q value in the adjustment module as the optimum Q value.

The above description is only the preferred examples of the present document, which is not used to limit the protection scope of the present document. All the modifications, equivalent substitutions, and improvements, etc. made within the spirit and principle of the present document shall fall into the protection scope of the present document.

What is claimed is:

1. A method for improving energy efficiency performance of a reader, comprising:
    A) initializing operation parameters, comprising initializing a current power level, an iteration value Xi and a quality factor Q of a reader antenna;
    B) adjusting the operation parameters by: adding an increment value to the current power level in the operation parameters, adding 1 to the Q, and acquiring a current number of frame timeslots;

C) judging whether the current power level is greater than a maximum power level, if yes, making the current power level being the maximum power level, then performing the following step E);
if the current power is less than or equal to a maximum power value, performing the following step D); wherein the maximum power level is a power level that can make a system keep a maximum throughput;
D) updating a frame timeslot status, and judging whether the current power level is required to be increased according to the updated frame timeslot status; if determining that a power level is required to be increased, performing the step B), and if determining that a power level is not required to be increased, performing the following step E); and
E) estimating a number of labels according to the current number of frame timeslots, and acquiring an optimum Q value according to the number of labels, and setting the current Q value as the optimum Q value, comprising: regarding the current number of frame timeslots as a total number of labels, and according to a mapping relationship table between the total number of labels and the optimum Q value, acquiring an optimum Q value corresponding to the total number of labels.

2. The method according to claim 1, wherein, the step of acquiring a current number of frame timeslots comprises:
acquiring the current number of frame timeslots according to a current Q value and a calculation formula for the number of frame timeslots.

3. A device for improving energy efficiency performance of a reader, comprising: an initialization module, an adjustment module, a setting module and an estimation module;
wherein the initialization module is configured to: initialize operation parameters by initializing a current power level, an iteration value Xi and a quality factor Q of a reader antenna, and notify the adjustment module;
the adjustment module is configured to: adjust the operation parameters by adding an increment value to the current power level, and adding 1 to the Q, acquire a current number of frame timeslots, and when determining that the current power level is less than or equal to a maximum power level value, send the current number of frame timeslots to the setting module; when determining that the current power level is greater than the maximum power level value, make the current power level being the maximum power level, and send the current number of frame timeslots to the estimation module; wherein the maximum power level is a power level that can make a system keep a maximum throughput;
the setting module is configured to: update a frame timeslot status, determine that a power level is not required to be increased according to the frame timeslot status, and send the current number of frame timeslots to the estimation module; determine that a power level is required to be increased according to the frame timeslot status, and notify the adjustment module; wherein the notification contains the current number of frame timeslots; and
the estimation module is configured to: estimate a number of labels according to the current number of frame timeslots, and acquire an optimum Q value according to the number of labels, and set the current Q value as the optimum Q value by: regarding the current number of frame timeslots as a total number of labels, and according to a mapping relationship table between the total number of labels and the optimum Q value, acquiring an optimum Q value corresponding to the total number of labels.

4. The device according to claim 3, wherein,
the adjustment module is specifically configured to: acquire the current number of frame timeslots according to a current Q value and a calculation formula for the number of frame timeslots.

5. The device according to claim 3, wherein, the setting module is specifically configured to: according to a received current number of frame timeslots and a communication protocol between the reader and the labels, update a number of idle timeslots, a number of successful timeslots and a number of conflicting timeslots.

6. The device according to claim 5, wherein the setting module is specifically configured to determine that the power level is not required to be increased when the number of conflicting timeslots is 0, or when the number of conflicting timeslots is greater than 0 and the number of successful timeslots is 0, and the iteration value after iterating is greater than a maximum iteration value.

7. The method according to claim 1, wherein, the step of updating the frame timeslot status comprises:
according to the current number of frame timeslots and a communication protocol between the reader and the labels, updating a number of idle timeslots, a number of successful timeslots and a number of conflicting timeslots.

8. The method according to claim 7, wherein, the step of determining that a power level is not required to be increased according to the updated frame timeslot status comprises:
determining that the power level is not required to be increased when the number of conflicting timeslots is equal to 0, or when the number of conflicting timeslots is greater than 0 and the number of successful timeslots is equal to 0, and the iteration value after iterating is greater than a maximum iteration value.

9. The method according to claim 1, wherein the step of determining that a power level is required to be increased comprises determining that the power level is not required to be increased when the number of conflicting timeslots is greater than 0 and the number of successful timeslots is also greater than 0, or when the number of conflicting timeslots is greater than 0 and the number of successful timeslots is equal to 0, and the iteration value after iterating is less than or equal to a maximum iteration value; when the number of conflicting timeslots is greater than 0 and the number of successful timeslots is also greater than 0, before performing the step B), clear the Xi.

10. The device according to claim 5, wherein the setting module is specifically configured to: when the number of conflicting timeslots is greater than 0 and the number of successful timeslots is also greater than 0, or when the number of conflicting timeslots is greater than 0 and the number of successful timeslots is equal to 0, and a iteration value after iterating is less than or equal to a maximum iteration value, determining that the power level is required to be increased.

* * * * *